United States Patent
Riffe

Patent Number: 5,975,283
Date of Patent: *Nov. 2, 1999

[54] VERTICAL BELT CONVEYOR SYSTEM

[75] Inventor: Shirley D. Riffe, Crab Orchard, W. Va.

[73] Assignee: Long-Airdox Company, Blacksburg, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/642,136

[22] Filed: May 2, 1996

[51] Int. Cl.$^6$ .................................................. B65G 15/08
[52] U.S. Cl. .................. 198/607; 198/549; 198/550.11; 198/821; 198/640
[58] Field of Search ..................................... 198/638, 640, 198/690.2, 703, 709, 711, 713, 714, 607, 549, 550.11, 821

[56] References Cited

U.S. PATENT DOCUMENTS

| | | | |
|---|---|---|---|
| 253,896 | 2/1882 | Smith | 198/703 |
| 299,656 | 6/1884 | Lesourd et al. | |
| 587,049 | 7/1897 | Tucker et al. | |
| 744,288 | 11/1903 | Brown | 198/703 |
| 998,763 | 7/1911 | Faggett | |
| 1,012,133 | 12/1911 | Higgins | |
| 1,133,008 | 3/1915 | Converse | |
| 1,242,249 | 10/1917 | Seaverns | |
| 1,391,703 | 9/1921 | Sturtevant | 198/709 |
| 1,830,603 | 11/1931 | Gumper | |
| 1,892,881 | 1/1933 | Fuller et al. | |
| 2,122,036 | 6/1938 | Lindburg | 198/152 |
| 2,347,437 | 4/1944 | Saxe | 214/16 |
| 2,685,957 | 8/1954 | Schlesinger | 198/149 |
| 2,711,816 | 6/1955 | Reno | 198/201 |
| 2,973,854 | 3/1961 | Roloson | 198/152 |
| 3,147,851 | 9/1964 | Dietrich | 198/198 |
| 3,236,365 | 2/1966 | Erisman | 198/703 |
| 3,750,864 | 8/1973 | Nolte | 198/201 |
| 4,333,561 | 6/1982 | Schlegel | 198/703 |
| 4,664,251 | 5/1987 | Gough | 198/607 |
| 5,143,203 | 9/1992 | Hinner | 198/708 |
| 5,564,878 | 10/1996 | Kay | 198/713 |

FOREIGN PATENT DOCUMENTS

| | | | |
|---|---|---|---|
| 595613 | 5/1994 | European Pat. Off. | 198/607 |
| 1081588 | 12/1954 | France | 198/821 |
| 150611 | 6/1989 | Japan | 198/703 |
| 1104437 | 2/1968 | United Kingdom | 198/821 |

*Primary Examiner*—Christopher P. Ellis
*Assistant Examiner*—Douglas Hess
*Attorney, Agent, or Firm*—Rudnick & Wolfe

[57] ABSTRACT

An endless belt conveyor including an independently supported first support pulley vertically and laterally displaced from a second support pulley. An endless belt including bulk material carrying compartments entrained around the first and second support pulleys and which is engaged by the full width of said support pulleys. The endless belt includes a radius of curvature near the top of the vertical run of a predetermined size such that the bulk material carried in the endless belt is not expel due to centrifugal force. A portion of the endless belt entrained over the first support pulley has a radius of curvature of a predetermined size such that the material carried in the endless belt is expelled due to centrifugal force.

20 Claims, 4 Drawing Sheets

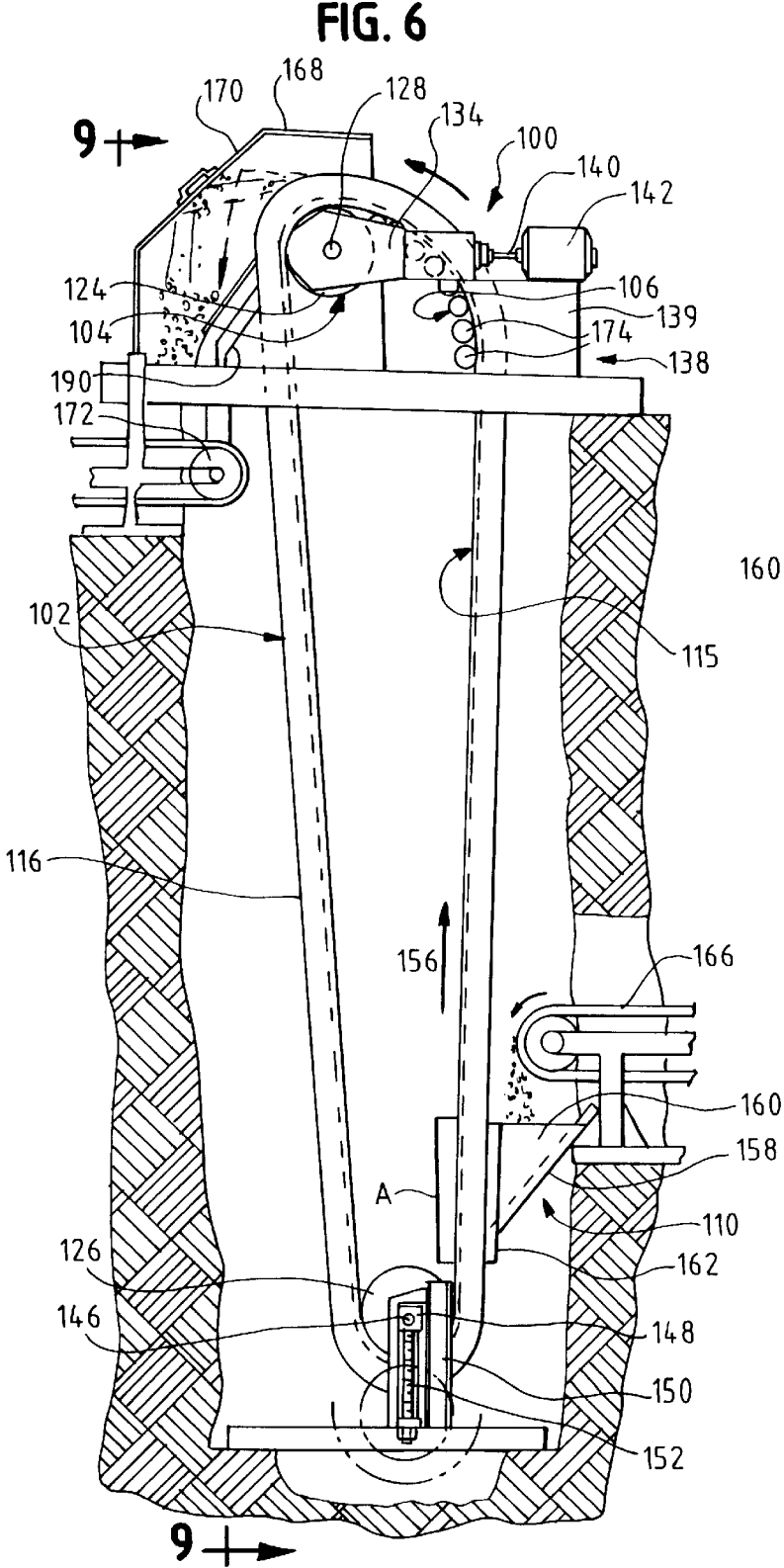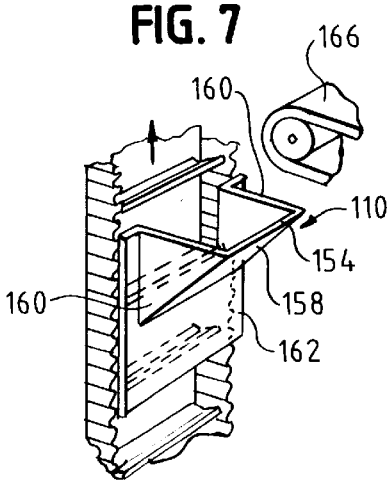

VERTICAL BELT CONVEYOR SYSTEM

FIELD OF THE INVENTION

The present invention relates generally to an elevating conveyor system for bulk material. More particularly, the present invention relates to a vertical belt conveyor system having an endless belt that moves bulk material such as coal from a loading position to a discharge position vertically displaced from the loading position without the need for intermediate support structure or redirection pulleys contacting the exterior surface of the endless belt.

BACKGROUND OF THE INVENTION

It is well known in the industry to use a pocket conveyor to convey loose bulk material such as coal, stone, sand, grain, etc., when the material must be conveyed vertically or at very steep angles. One type of pocket conveyor for this use utilizes a flexible side wall type of rubber belting. This type of belt consists of a flat, reinforced rubber, base belt to which side walls constructed of corrugated shaped reinforced rubber are attached and between the two side walls, cross-flights or cleats are attached at regular intervals along the length of the belt to form troughs or pockets where the bulk material can be deposited.

The common method used to construct a steep angle or vertical conveyor of this type requires the flexible side wall belt to be bent around a series of pulleys or deflection wheels as shown in the prior art design illustrated in FIG. 1. When the belt must be bent in a direction that allows the bottom of the flat base belt to contact the pulley, a cylindrical-shaped pulley that extends across the full width of the base belt can be used; however, if the belt must be bent in the opposite direction, deflection wheels that contact the external surface of the base belt, only on the portion of the base belt that extends beyond the outside width of the side walls are used. The two deflection wheels are attached to a common shaft and the shaft is supported by bearings located outside each of the deflection wheels. The outside diameter of the deflection wheels must be large enough to allow the connection shaft to pass across the side walls that assist in forming the pockets that carry the bulk material. Therefore, in these prior art arrangements, the width of the flat base belt must be sufficiently wide to allow a portion of the base belt to extend laterally beyond the width of the two side walls. In these prior art constructions, the base belt extended laterally beyond the width of the two side walls approximately 10 to 18 inches. As a consequence, a portion of the width of the base belt is not utilized in cooperation with the sidewalls in forming the pockets or troughs.

In addition, when the belt must be bent around deflection wheels to redirect the belt, the maximum allowable belt tension is much less than when the belt is bent around a full-width cylinder shaped pulley. This is due to the fact that if the belt is bent around the deflection wheels, the total belt tension stress is concentrated near the edges of the base belt. On the other hand, if the belt is bent around a full width cylindrical pulley, the total belt tension stress is evenly distributed across the full-width of the base belt. Moreover, when the belt is bent around deflection wheels, the possibility exists that the belt will collapse down between the two deflection wheels if the belt tension exceeds the lateral strength of the belt. This may cause severe belt damage, or total destruction of the belt as well as loss of operation of the conveyor.

In addition, conventional vertical conveyors that are used to carry bulk material have a section of the flexible side wall belt travelling in a horizontal direction where the material is loaded onto the belt at the bottom of the lift, and another section of the belt travelling in a horizontal direction where the material is discharged at the top of the lift. This arrangement requires the belt to be bent around both full-width cylinder pulleys and deflection wheels. The maximum lift that can be achieved with this type of conveyor for any given belt strength is usually limited by the maximum belt tension sustainable where the belt wraps around the deflection wheels at the top of the lift. This tension is created by the weight of the vertical portion of the belt suspended from the deflection wheels at the top of the lift. Consequently, the length of the endless conveyor belt in prior art devices was considerably limited.

There is a growing need for vertical conveyors with very high lifts, often exceeding 600 feet, and the weight of this type of belt can be as much as 75 pounds per foot. Therefore, the resulting belt tension at the location of the deflection wheels at the top of the lift often can exceed 45,000 pounds. This belt tension approaches a load range where there is no belt available that has sufficient cross strength to operate properly. Another disadvantage of many prior art vertical conveyors is that they require support structure to be constructed over the entire length of the vertical run of the belt. When high vertical runs are required, it is generally time consuming and economically inefficient to construct a support structure for the conveyor that spans the entire vertical run.

In view of the above, there remains a need for a steep angle or vertical conveyor capable of traversing significantly high vertical runs that does not require the use of deflection wheels nor intermediate support structure.

There is also a need for a vertical conveyor system that can utilize the full tensile strength of the belt wherein all bends in the belt can be supported with full width cylindrical pulleys, therefore achieving a greater vertical lift. In addition, there is a need for the vertical conveyor system capable of traversing significant vertical runs that uses a less expensive base belt due in part to the fact that the overall width of the conveyor can be less than a conveyor system that requires deflection wheels. In addition, because the tension created by the belt is distributed over the entire width of the belt due to its full contact with the pulley, stronger and generally more expensive belts are not required.

SUMMARY OF THE INVENTION

The purpose and advantages of the invention will be set forth in and apparent from the description and drawings that follow, as well as will be learned by practice of the invention. Additional advantages of the invention will be realized and attained by the elements of the apparatus particularly pointed out in the appended claims.

To achieve these and other advantages and in accordance with the purpose of the invention, as embodied and broadly described herein, the vertical belt conveyor system of the present invention includes the following. An elevating conveyor for bulk material including an endless belt having a support pulley engaging surface on one side of the belt and a plurality of bulk material carrying compartments on the opposite side. The belt is entrained around a plurality of support pulleys with the support pulleys engaging the entire transverse width of the support pulley engaging surface of the endless belt. The belt includes an elevating section and a descending section.

A loading station is disposed adjacent the elevating section of the bulk material carrying surface of the endless belt.

The present invention also includes a drive motor for driving at least one of the support pulleys for moving the endless belt that is entrained around the support pulleys.

One of the spaced apart pulleys is located at the generally uppermost location of the endless belt. The one pulley has a radius of curvature of predetermined size so that the centrifugal force generated by the movement of the belt and acting on the bulk material carried in the bulk material carrying compartments of the belt overcomes gravity thereby expelling the bulk material from the compartments. In addition, a series of nose over rollers are positioned upstream and in proximity to the one support pulley forming a radius of curvature of a predetermined size so that the centrifugal force created by the movement of the belt and acting on the bulk material carried in the bulk material carrying compartments does not overcome gravity. A take up pulley is positioned at the lowermost location of the endless belt. Each of the one pulley and the take up pulley are independently supported thereby removing the necessity for a support structure intermediate the one pulley and the take up pulley.

It is to be understood that both the foregoing general description and the following detailed description are exemplary and provided for purposes of explanation only, and are not restrictive of the invention, as claimed.

BRIEF DESCRIPTION OF THE DRAWINGS

The accompanying drawings which are incorporated and constitute a part of this specification, illustrate the preferred embodiment of the invention, and together with the description, serve to explain the principals of the invention.

FIG. 6 is a side elevational view of the preferred embodiment of the present invention;

FIG. 7 is a isometric view of the loading hopper used in the present invention;

DETAILED DESCRIPTION OF THE PREFERRED EMBODIMENT

Figure 1:
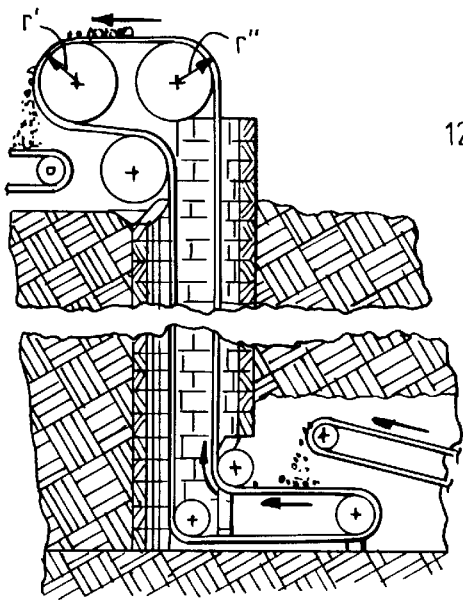
FIG. 1 is a side elevational view of a prior art endless belt conveyor system.

Reference will now be made in detail to the present preferred embodiment of the vertical belt conveyor system of the present invention for moving bulk material vertically, examples of which are illustrated in accompanying drawings. Wherever possible, the same reference characters will be used throughout the drawings to refer to the same or like parts.

An exemplary embodiment of the preferred vertical belt conveyor system of the present invention is shown in FIG. 6 and designated generally by reference character 100. FIG. 6 shows the endless belt 102, the cylindrical pulleys 104, nose over rollers 106, the support assembly 138 and the loading hopper assembly 110.

Figure 5:
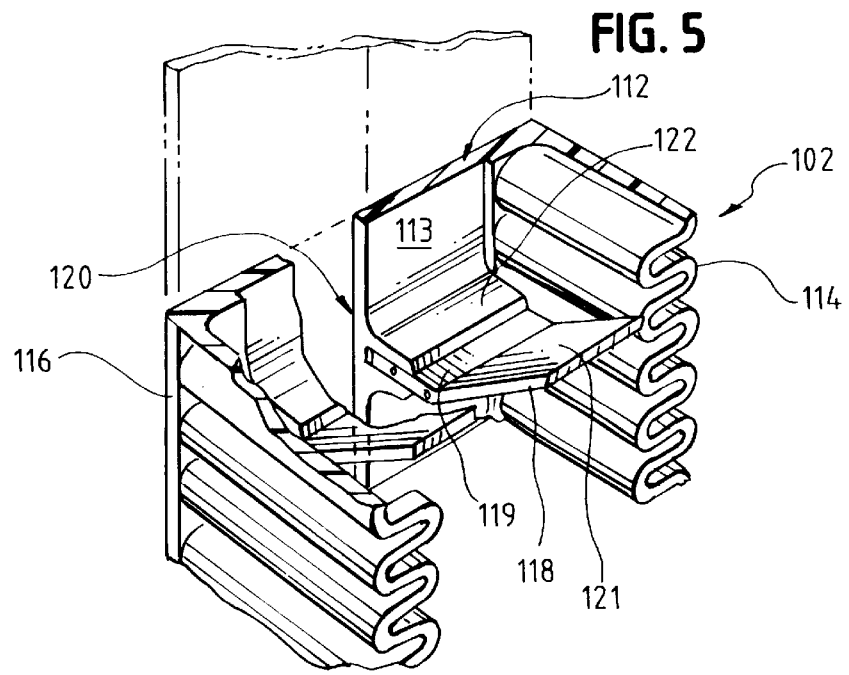
FIG. 5 is an isometric view of a portion of the endless belt of the present invention with a portion of the belt cut away.

As illustrated in FIGS. 5 and 6, the endless belt 102 includes a flat reinforced rubber base belt 112 having exterior surface 113 and interior surface 115. Sidewalls 114 constructed of corrugated-shaped reinforced rubber are connected to the base belt 112 along opposite edges 116 of the base belt 112. The sidewalls 114 are preferably integrally formed with the base belt 112 and of unitary construction. Between the two sidewalls 114, cross-flights or cleats 118 are attached at regular intervals along the length of the belt to form troughs or pockets 120 where the bulk material can be deposited. The cleat and sidewalls may be constructed of various heights depending on the trough or pocket volume desired. Similarly, the width of the base belt 112 may be of any desired dimensions. Typically, the belt width is four (4) inches less than the width of the pulley.

As illustrated in FIG. 5, the cleats 118 are disposed substantially perpendicular to the exterior surface 113 and transversely across the width of the base belt 112. The cleats 118 are seated in a transversely extending channel 122 formed in the base belt 112 by upstanding short walls 122 and the cleats are secured thereto preferably by bolts. Alternatively, the cleats 118 may be integrally formed with the base belt 112. A portion 121 of the main body 119 of the cleats 118 may be angled slightly upwardly to assist in the prevention of spillage of bulk material carried in the troughs 120. This type of belt construction is well known in the art with the exception that the present invention utilizes a belt that does not extend laterally beyond the position of the two sidewalls 114.

Figure 2:
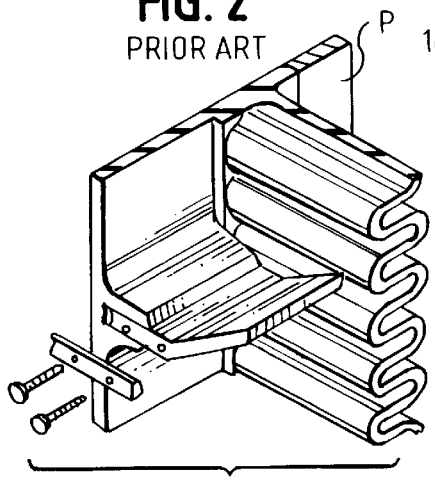
FIG. 2 is an isometric view of a portion of a prior art endless belt.

As discussed above, prior art endless conveyors that were required to be redirected to force the bulk material to exit the troughs needed to have the base belt extend beyond the position of the sidewalls as is illustrated in FIG. 2. This construction provided a portion P of the base belt to be contacted by the redirection pulleys or wheels. In the present conveyor system, because no redirection pulley is necessary, the sidewalls 114 can be positioned at the outermost edge of the base belt 112. Consequently, the entire width of the base belt can be used in cooperation with the sidewalls 114 and the cleats 118 to provide a larger volume trough or pocket 120 when compared to prior art rubber base belts of identical widths that required a portion of the base belt to extend laterally beyond the position of the two sidewalls. As a result, the weight of the belt per unit volume of bulk material capable of being moved on a base belt of a given width is decreased.

Figure 4:
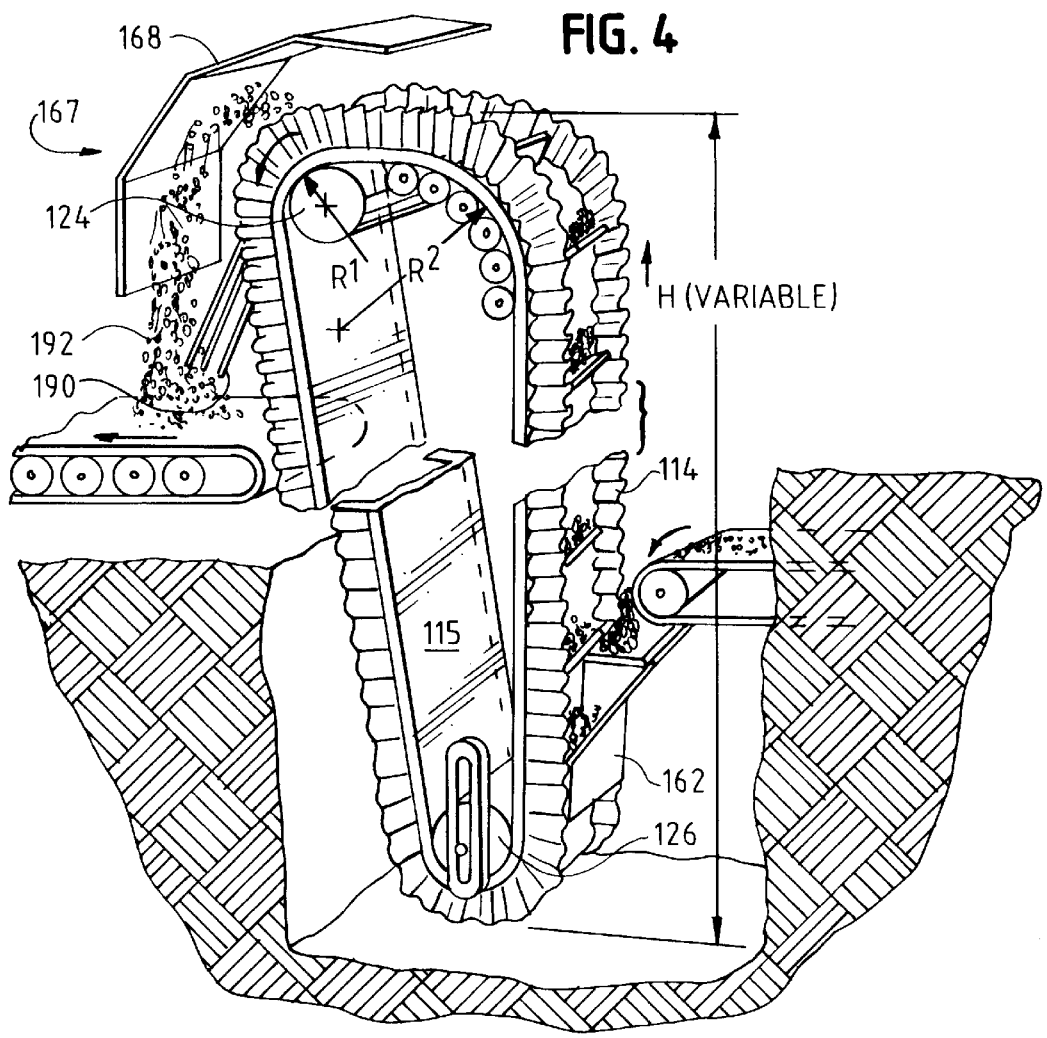
FIG. 4 is a schematic view of the vertical belt conveyor system of the present invention.
Figure 8:
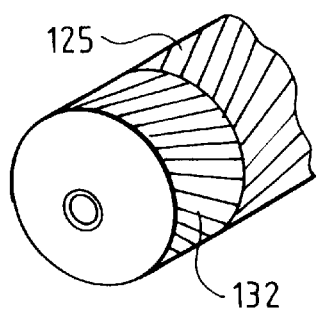
FIG. 8 is an isometric view of the drive pulley used in the present invention.
Figure 9:
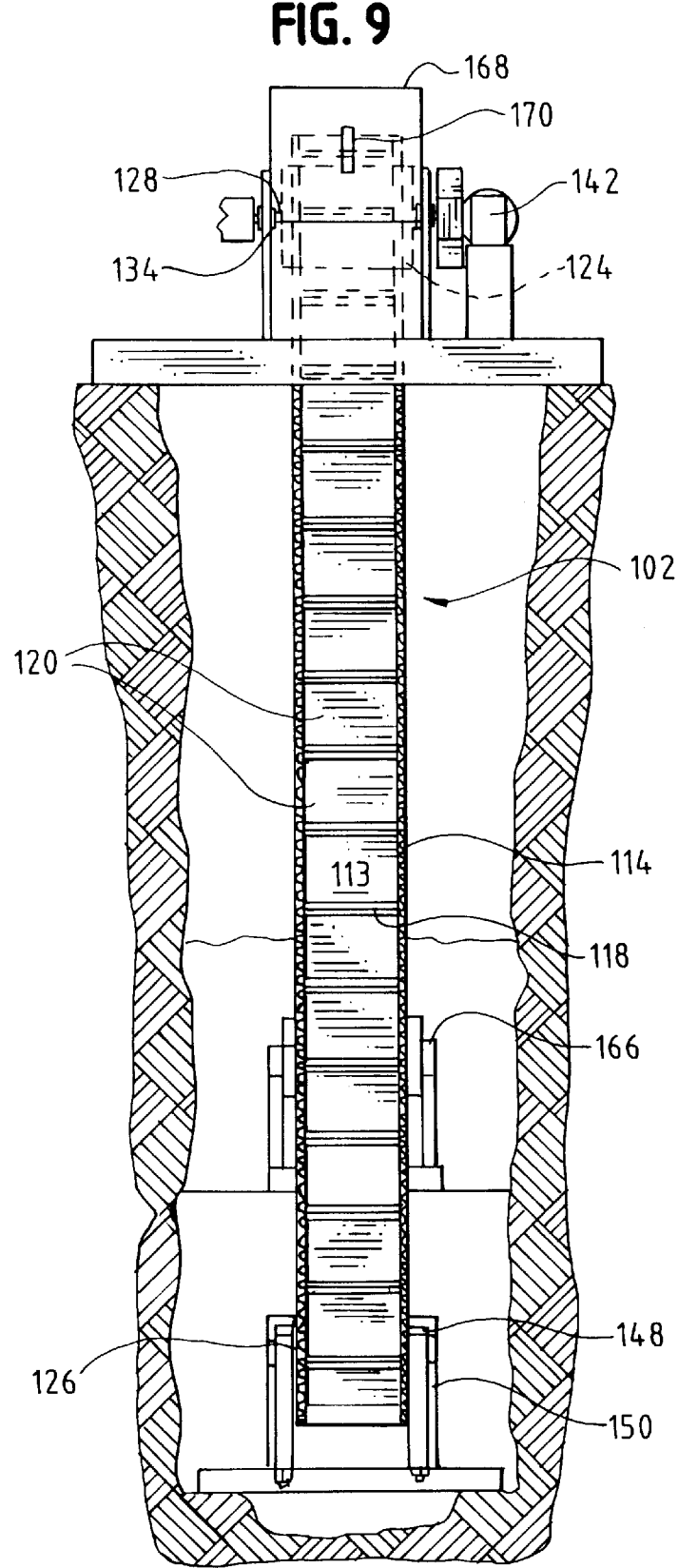
FIG. 9 is a front elevational view of the vertical belt conveyor system of the present invention.

As illustrated in FIGS. 6 and 4, the vertical belt conveyor system of the present invention includes a discharge pulley 124 and an take up pulley 126 over which the endless belt 102 is entrained. The discharge pulley 124 is supported at the top of the vertical conveyor by a support assembly 138. The support assembly 138 includes a rigid steel frame 139 positioned at the top of the vertical run traversed by the endless belt in a manner well known in the art. The frame 139 should be sufficiently wide so as not to interfere with the endless belt as it moves around the discharge pulley 124 and noseover rollers 106. The discharge pulley 124 is preferably made of steel and may include a coating 125 on the outer surface to increase friction and reduce wear with a preferably herringbone grooved pattern as shown in FIG. 8. Coating of the conveyor pulley to provide driving friction and better wear is well known in the art. For example, the coating on the pulley may be a vulcanized rubber or ceramic material. Other material which will aid to increase friction and reduce wear may also be provided. The discharge pulley 124 may include a raised annular portion 132 disposed around the center of the outer cylindrical surface of the discharge pulley 124 to maintain the belt 102 on the pulley 124 and prevent movement of the belt axially along the pulley's outer surface. The discharge pulley 124 is secured to a transverse drive shaft 128 and has a width that extends slightly beyond the width of the belt. Drive shaft 128 is rotatably mounted on a pair of bearings 134. Support brackets 136 carried on the support assembly 138 mount the bearings 134 in fixed positions.

The drive shaft 128 is driveably connected in a manner well known in the art to a power unit shown in FIG. 6 as an electric motor 142 with a drive in the form of a shaft 140. The motor 142 is secured to support assembly 138. The motor should be sufficiently large enough to drive the discharge pulley to move the endless belt at the rate of between 300 to 600 feet per minute. The present invention may also be operated at slower as well as faster speeds. The drive may alternatively be a belt or endless chain. The power unit may alternatively be a hydraulic motor, air motor, internal combustion engine, or like power sources.

The discharge pulley 124 is sized and forms a radius of curvature $R_1$ as shown in FIG. 4 of the endless belt when the endless belt is entrained thereon that is small enough so that the centrifugal force created as the endless belt is moved along the discharge pulley and the take up pulley 126 forces the bulk material carried in the pockets or troughs 120 to overcome the force of gravity and be expelled from the troughs 120. The radius of the discharge pulley is a factor of the belt speed.

The minimum radius of the discharge pulley is determined by the minimum allowable bending radius of the belt with the attached sidewalls. The radius of the discharge pulley can be determined using the following formula $R_1 < V^2/g$, where: $R_1$=the radius of the discharge pulley; V=the linear velocity of the material in the pockets in feet per second; and G=the acceleration of gravity in feet/sec/sec. Referring again to FIG. 6, the present invention also utilizes a take up pulley 126 disposed at the lowermost run of the endless belt. The take up pulley 126 is spaced vertically downwardly from the discharge pulley. In many cases, it will be advantageous to have the discharge pulley and the take-up pulley in the same vertical plane. If the conveyor is to be used in a very deep shaft less space will be required at the bottom of the shaft if the pulleys are in the same plane. Alternatively, the take-up pulley 126 may be positioned laterally from the discharge pulley 124 to assist in forming the radius of curvature $R_1$.

The take-up pulley 126 is positioned and carried on a transverse shaft 146. The take-up pulley is also made of a steel drum, however, it is not necessary that the cylindrical outer surface be covered with vulcanized rubber. Bearings 148 mount the opposite ends of the shaft 146 to an adjustable support structure 150. The adjustable support structure 150 in the present embodiment of the present invention is independent of the support assembly 138 used to carry the discharge pulley 124. The take-up pulley 126 is generally not driven and may also be an idler or base wheel or pulley.

The bearings 148 supporting the transverse shaft 146 of the take up pulley 126 are vertically adjustable. The vertically adjustable support 150 permits movement of the take-up pulley 126 approximately two feet in the vertical direction. This permits the endless belt 102 to be entrained around the take-up pulley and the discharge pulley as well as providing a means for tensioning the endless belt around the pulleys by moving the take-up pulley 126 vertically downward once the belt is entrained around the pulleys. The adjustable support 150 may be in the form of a screw adjustment 152 attached to each bearing. The screws extend through the bearing and the support 152. Rotation of the screw through the bearing permits the take-up pulley to be raised or lowered through about a two feet take up zone. Alternatively, the bearing may be a free-sliding bearing with a counter weight to maintain proper tension on the endless belt.

The take-up pulley 126 and the discharge pulley 124 need not be constructed with the same diameter, but the typical range of pulley diameters of both is between 20" to 48". The typical pulley face width for both the take-up pulley 126 and the discharge pulley 124 is belt width plus 4".

The present invention also includes a series of noseover rollers 174 positioned near the discharge pulley 124. The noseover rollers 174 are shaped similarly to the discharge pulley 124 but constructed with a generally smaller diameter. The noseover rollers 174 are supported on the support assembly 138 by individual shafts and bearing combinations (not shown) and are positioned in series near the uppermost section of the upper run of the endless belt. The noseover rollers 174 are positioned upstream from the discharge pulley 124. The noseover rollers 174 provide a gradual radius of curvature for the endless belt 102 as it approaches the discharge pulley. The use of noseover rollers to provide a gradual change in the direction of movement of a belt is well known in the art. The radius of curvature $R_2$ as illustrated in FIG. 6 created by the noseover rollers 174 is large enough so that the bulk material carried in the troughs 120 does not exit the troughs due to centrifugal force as the endless belt travels over the noseover rollers 174. As with the discharge pulley 124 and the take up pulley 126, the noseover rollers 174 contact the full width of the interior surface 115 of the endless belt 102.

Referring to FIGS. 6 and 7, the present invention also includes a loading hopper assembly 110 where material is delivered to the endless belt at an area A on its upward run between the take up pulley and the discharge pulley. The hopper 154 is positioned adjacent the upward run 156 of the endless belt 102. The hopper 154 includes a downwardly angled floor 158 that is generally the same width as the endless belt and which terminates adjacent the upwardly moving belt 102. A pair of sidewalls 160 are disposed on either side of the floor 158 and also terminate adjacent the upwardly moving belt 102. A downwardly depending skirt 162 is attached to the terminating portion of the angled floor 158 of the hopper and extends downwardly vertically adjacent the upwardly travelling belt. The skirt section 162 of the loading hopper should extend from the terminating edge of the angled floor 158 below the loading hopper at least the distance between the cleats 118 on the belt 102 to prevent the spillage of bulk material as it moves down the ramp into the troughs 120 formed on the belt.

Bulk material may be delivered to the hopper 154 by truck or more generally as is the case illustrated in FIGS. 6 and 7, by a horizontal conveyor 166 carrying bulk material from another section of a mine or underground excavation site.

The present invention may also be provided with a discharge chute 167 including a discharge hood 168 disposed adjacent the discharge pulley 124. The discharge hood 168 is spaced from and positioned over the portion of the endless belt 102 that is entrained over the discharge pulley 124. The discharge hood 168 is preferably made from steel and is supported by any suitable support assembly (not illustrated). For example, the hood 168 may be attached for support to the discharge conveyor positioned adjacent the discharge pulley that receives bulk material expelled from the vertical conveyor. The discharge hood includes a baffle plate 170 that is spaced from and generally tangential to the portion of the endless belt entrained around the discharge pulley 124 to direct the material discharged from the belt to an appropriate container such as a horizontal conveyor 172 or truck or other material handling device.

The discharge hood 168 also includes a bottom plate 190 and a number of internal deflector plates 192. The bottom plate 190 and the deflector plates 192 will extend from a point very close to the sidewalls and crossflights of the belt downward at an angle of approximately 60° with the horizontal. The bottom plate 190 and the deflector plates 192 should not touch or interfere with the sidewalls or crossflights of the base belt. The purpose of the deflector plates 192 and the bottom plate 190 is to direct any material that might not be thrown out of the pockets by the centrifugal force on to the receiving belt or hopper, for example, some material might stick in the pocket and break loose after the belt has gone around the discharge pulley.

As illustrated in the preferred embodiment of FIG. 6, the present invention can be utilized without intermediate support structure between the discharge pulley 124 and the take up pulley 126. This arrangement is particularly convenient for handling material over very long stretches including heights of 600 feet or more of vertical travel. This arrangement shown in FIG. 6 is very quickly set up, efficient, and significantly less expensive than structures requiring support over the entire length of the vertical run of the endless belt.

Figure 3:
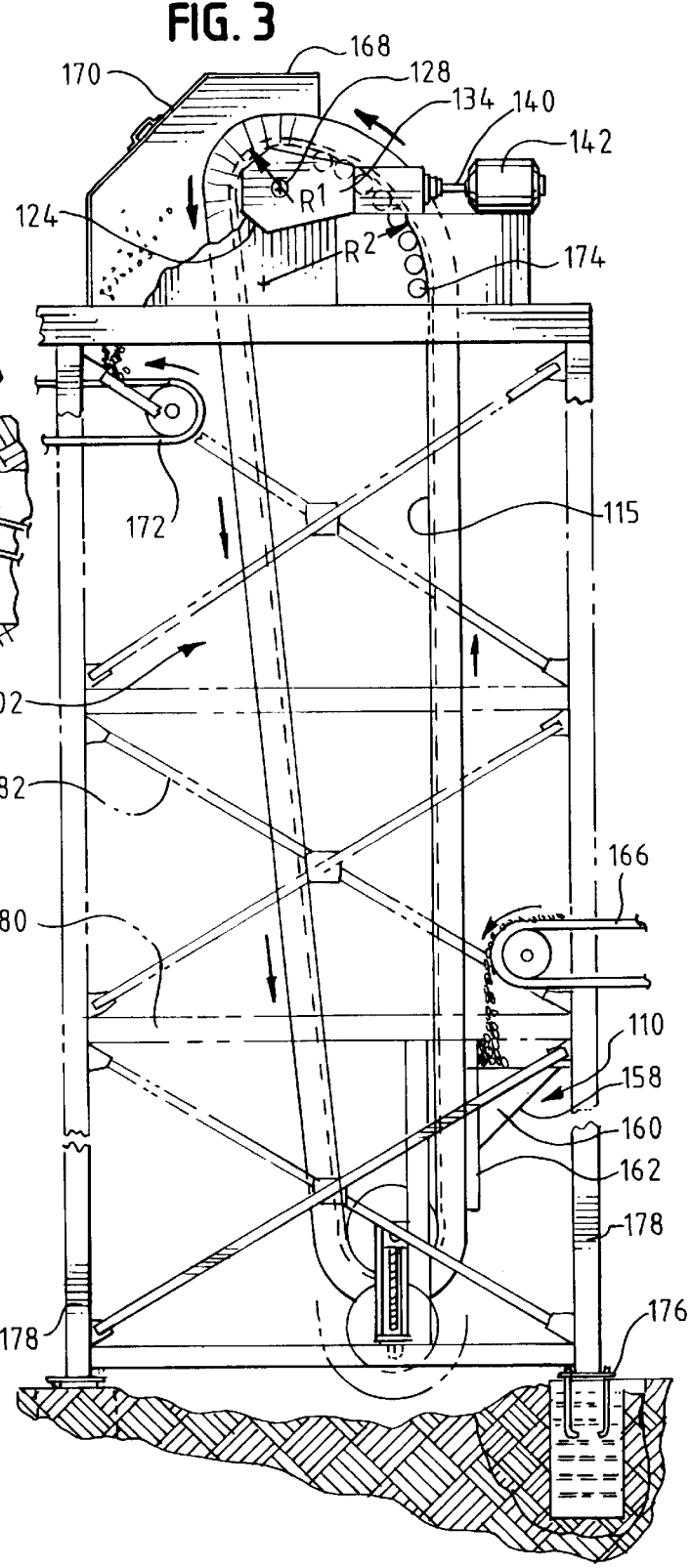
FIG. 3 is a side elevational view of an alternative embodiment of the vertical belt conveyor system of the present invention.

In an alternative embodiment shown in FIG. 3, the present vertical conveyor system is utilized with an intermediate support structure. The support assembly includes four upright pillars 178 carried in footings 176 with the four upright pillars being oriented in a rectangular or square position. Each upright pillar 178 is connected to its two adjacent pillars by horizontal reinforcement members 180 disposed at various intervals as well as cross-bars 182. Configuration of the support assembly may be constructed in a variety of ways well known in the art. The support assembly's essential attribute is that it be able to support the weight of the pulleys, belt, and the material carried in the vertical belt conveyor. However, it should be noted that the design of the present invention includes fewer pulleys and a lighter belt which reduces the weight that needs to be supported by the support assembly.

In operation, the present invention shown in FIG. 6 is arranged as described above and the drive motor 142 is engaged to the discharge pulley drive shaft, which in turn drives the endless belt 102. The endless belt 102 is entrained around the discharge pulley 124 and the uptake pulley 126. It is preferred that the interior surface of the belt be placed on the discharge pulley 124 first with the remainder of the belt being lowered down the shaft or lift area to the take up pulley 126. The endless belt, may then be entrained around the take up pulley 126 which is equipped with an adjustable support assembly which permits the belt to fit over the pulley and then be tensioned using the adjustable screw 152. Bulk material is delivered to the loading hopper preferably by horizontal conveyor 166 and discharged into the hopper 154 sliding down the angled floor 158 of the hopper into the moving pockets or troughs 120 formed on the endless belt as the troughs 120 move in a vertical direction past the loading hopper. The bulk material is maintained in the troughs 120 as the endless belt 102 moves vertically in its vertical run as it reaches the noseover rollers 174 positioned at the uppermost point of the run of the belt. As the bulk material travels over the noseover rollers, they are gradually angled toward the discharge hood and the discharge pulley. The material in the pockets and troughs is maintained in the troughs 120 as the belt 102 travels over the generally large radius of curvature created by the nose over rollers 174. However, as the material filled pockets 120 approach the discharge pulley, the radius of curvature of the endless belt 102 is considerably smaller and the centrifugal force acting on the material carried in the pockets causes the material to exit the pockets into the discharge hood striking the discharge baffle and ultimately ending up in a discharge horizontal conveyor.

In view of the description above, it is evident that the present invention provides a new and unique vertical belt conveyor for transporting bulk material. Although reference has been made to the use of the present invention, it will also be apparent to those skilled in the art that various modifications and variations can be made in the design and construction of the vertical belt conveyor system without departing from the scope or spirit of the invention.

Other embodiments of the invention will be apparent to those skilled in the art from consideration of the specification and practice of the invention disclosed herein. It is intended that the specification and examples be considered exemplary only, with the true scope and spirit of the invention being indicated in the following claims.

What is claimed is:

1. An elevating conveyor for bulk material comprising:
   a first support pulley and a second support pulley vertically displaced from said first support pulley, said first support pulley having an outer perimeter and a radius $R_1 < V^2/g$, where $R_1$=the radius of the first support pulley, V=the linear velocity of the outer perimeter in feet per second, and g=the acceleration of gravity in feet/second/second;
   a series of noseover rollers disposed adjacent and to one side of said first support pulley, the noseover rollers collectively defining an arc having a radius R2, the radius R2 being greater than the radius R1;
   drive means for rotating said first support pulley;
   an endless belt including a reinforced rubber base belt, corrugated sidewalls connected to the lateral edges of said base belt, and a plurality of longitudinally spaced cleats extending substantially perpendicular from said base belt and disposed transversely across said base belt between said sidewalls forming a plurality of bulk material carrying compartments that extend substantially entirely across said base belt;
   said endless belt entrained for movement around said first and second support pulleys, said endless belt having a radius of curvature of a predetermined magnitude as it passes over said noseover rollers that prevents the centrifugal force acting on material carried in said bulk material carrying compartments from being expelled therefrom, said endless belt having a radius of curvature of a predetermined magnitude as it travels over said first support pulley such that the centrifugal force acting on said bulk material carried in said bulk material carrying compartments causes said bulk material to be expelled therefrom;
   a first support assembly for supporting said first support pulley; and
   a second independent support assembly for supporting said second support pulley.

2. The elevating conveyor of claim 1 further including a discharge chute disposed adjacent said support pulley having a discharge hood spaced from the portion of the endless belt entrained around the first support pulley, at least one deflection plate angled downwardly away from said base belt and having a leading edge positioned adjacent the sidewalls and cleats of said base belt, and a bottom plate spaced from and generally parallel to said discharge hood and having a leading edge positioned adjacent the sidewalls and cleats of said base belt for directing the bulk material expelled from said bulk material carrying compartments.

3. The elevating conveyor of claim 1 wherein said sidewalls are formed integrally with said base belt.

4. The elevating conveyor of claim 1 wherein said first support pulley includes a cylindrical steel drum having a layer of material disposed on the cylindrical outer surface of said drum to provide driving friction and a wear surface.

5. The elevating conveyor of claim 4 wherein said first support pulley includes an annular raised portion disposed on the cylindrical outer surface of said pulley.

6. The elevating conveyor of claim 1 wherein said second support pulley includes a cylindrical steel drum sized similarly to said first support pulley.

7. The elevating conveyor of claim 1 wherein said second support assembly includes bearings mounted to a support member for supporting said second support pulley and having a rotatable screw disposed vertically through said bearings and support members for moving said bearings vertically relative to said support.

8. The elevating conveyor of claim 1 wherein said first support pulley is disposed above said second support pulley.

9. An elevating conveyor for bulk material comprising:
 a first support pulley and a second support pulley vertically displaced from said first support pulley;
 a series of noseover rollers disposed adjacent and to one side of said first support pulley;
 drive means for rotating said first support pulley;
 an endless belt including a reinforced rubber base belt, corrugated sidewalls connected to the lateral edges of said base belt, and a plurality of longitudinally spaced cleats extending substantially perpendicular from said base belt and disposed transversely across said base belt between said sidewalls forming a plurality of bulk material carrying compartments that extend substantially entirely across said base belt;
 said endless belt entrained for movement around said first and second support pulleys, said endless belt having a radius of curvature of a predetermined magnitude as it passes over said noseover rollers that prevents the centrifugal force acting on material carried in said bulk material carrying compartments from being expelled therefrom, said endless belt having a radius of curvature of a predetermined magnitude as it travels over said first support pulley such that the centrifugal force acting on said bulk material carried in said bulk material carrying compartments causes said bulk material to be expelled therefrom;
 a first support assembly for supporting said first support pulley; and
 a second independent support assembly for supporting said second support pulley.

10. The elevating conveyor of claim 9 wherein said second support assembly includes bearings mounted to a support member for supporting said second support pulley and having rotatable screws disposed vertically through said bearings and support member for moving said bearings vertically relative to said support.

11. The elevating conveyor of claim 9 wherein said first support pulley is disposed above said second support pulley.

12. The elevating conveyor of claim 9 wherein said sidewalls are formed integrally with said base belt.

13. The elevating conveyor of claim 9 wherein said first support pulley includes a cylindrical steel drum having a layer of material disposed on the cylindrical outer surface to provide driving friction and a wear surface.

14. The elevating conveyor of claim 13 wherein said first support pulley includes an annular raised portion disposed on the cylindrical outer surface of said pulley.

15. The elevating conveyor of claim 9 wherein said second support pulley includes a cylindrical steel drum sized similarly to said first support pulley.

16. A conveyor system for elevating bulk material from a loading position through a vertical distance to a discharge position comprising:
 a) a first independent support assembly including:
  i) a first support pulley;
  ii) a drive means for rotating said first support pulley;
  iii) a series of noseover rollers disposed adjacent and to one side of said first support pulley;
  iv) a discharge chute having a deflection hood spaced from said first support pulley;
 b) a second independent support assembly including:
  i) a support member;
  ii) bearings mounted on said support member;
  iii) a second support pulley supported by said bearings;
  iv) rotatable screws disposed through said bearings and said support member for vertically displacing said bearings relative to said support member;
  v) a loading hopper having an angled floor and adjacent sidewalls;
 c) an endless belt having a support pulley engaging surface on one side of said belt and a plurality of bulk material carrying compartments on an opposite side, said endless belt sized to move around said first and second support pulleys and to traverse the vertical distance, said endless belt also having a radius of curvature of a predetermined magnitude as it passes over said noseover rollers that prevents the centrifugal force acting on material carried in said bulk material carrying compartments from being expelled therefrom and said endless belt having a radius of curvature of a predetermined magnitude as it travels over said first support pulley such that the centrifugal force acting on said bulk material carried in said bulk material carrying compartments causes said bulk material to be expelled therefrom;
 whereby the conveyor system may be easily set up by independently placing said first and second support structures at the discharge and loading positions, respectively, with no intermediate support structure therebetween, and extending said endless belt between the first and second support structures via engagement with said first and second support pulleys.

17. The elevating conveyor of claim 9 wherein said first support pulley includes an annular raised portion disposed on the cylindrical outer surface of said pulley.

18. The elevating conveyor of claim 9 wherein said second support pulley includes a cylindrical steel drum sized similarly to said first support pulley.

19. The elevating conveyor of claim 16 wherein said endless belt includes a reinforced rubber base belt, corrugated sidewalls connected to the lateral edges of said base belt, and a plurality of longitudinally spaced cleats extending substantially perpendicular from said base belt and disposed transversely across said base belt between said sidewalls forming said bulk material carrying compartments.

20. The elevating conveyor of claim 19 wherein said sidewalls are formed integrally with said base belt.

* * * * *